Dec. 13, 1960     H. M. PICKING, JR., ET AL     2,964,349
UNDERTAKER'S VEHICLE

Filed June 10, 1958     4 Sheets-Sheet 1

Howard M. Picking, Jr.
Harold E. Miller
INVENTORS

BY
Attorneys

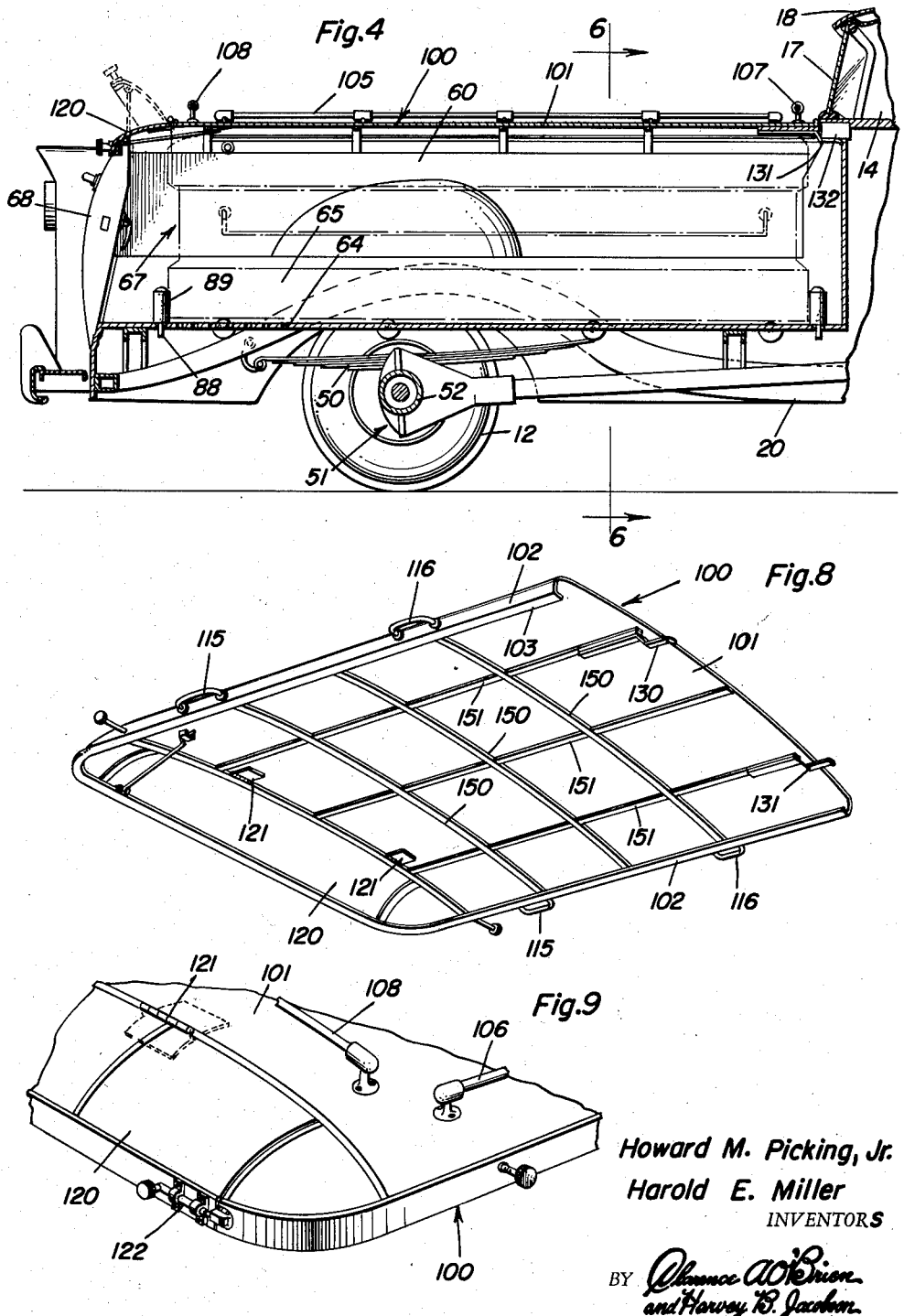

Dec. 13, 1960 H. M. PICKING, JR., ET AL 2,964,349
UNDERTAKER'S VEHICLE
Filed June 10, 1958 4 Sheets-Sheet 3
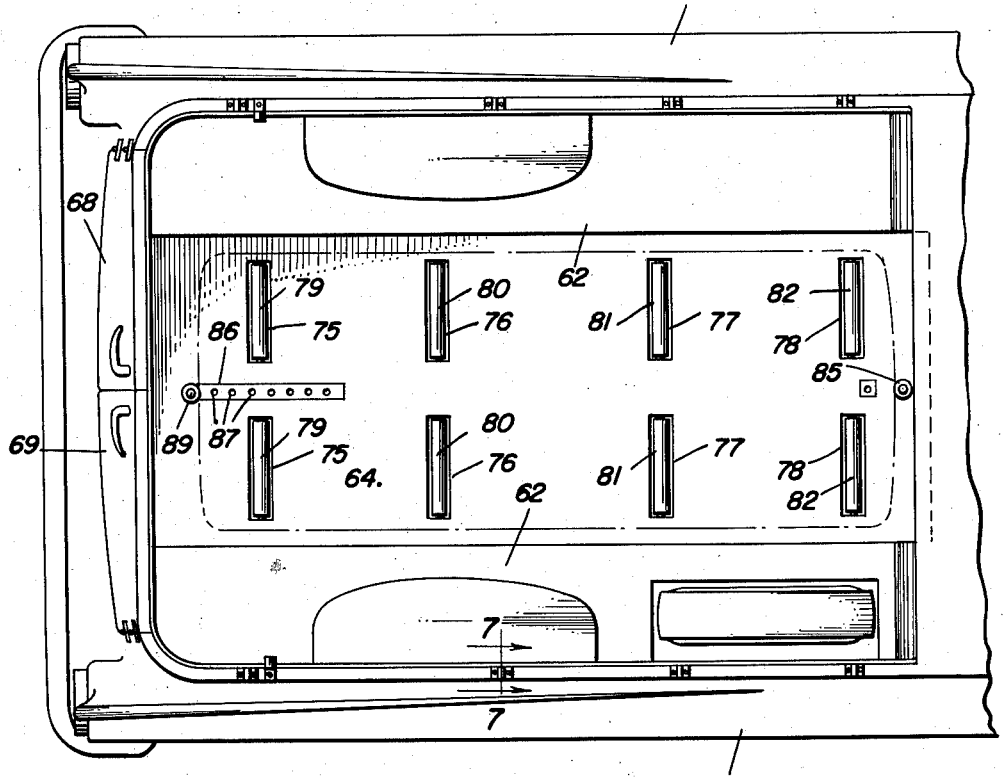
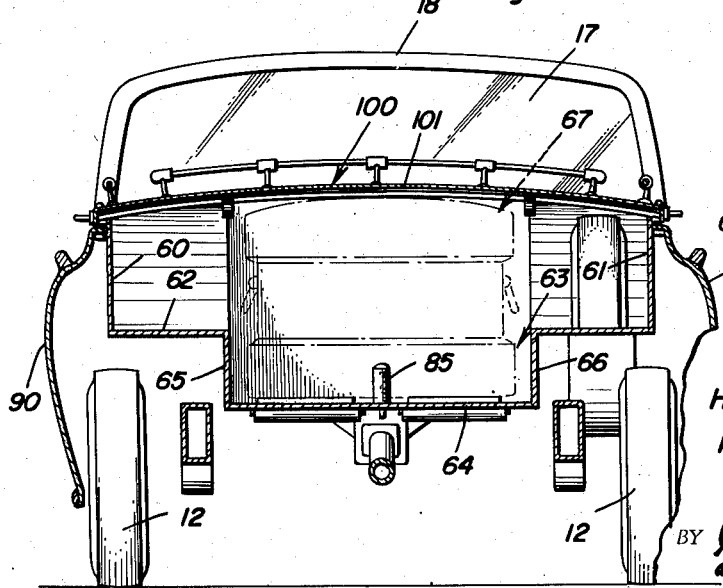
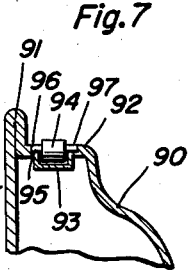
Howard M. Picking, Jr.
Harold E. Miller
INVENTORS Dec. 13, 1960    H. M. PICKING, JR., ET AL    2,964,349
UNDERTAKER'S VEHICLE
Filed June 10, 1958    4 Sheets-Sheet 4
Fig.10
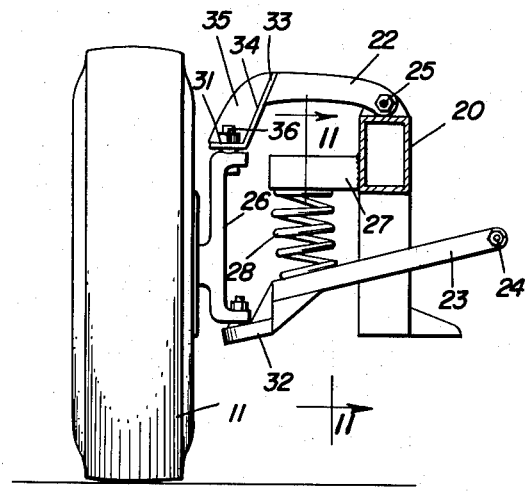
Fig.11
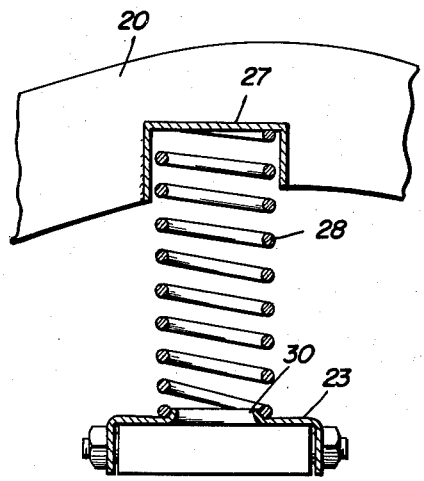
Fig.12
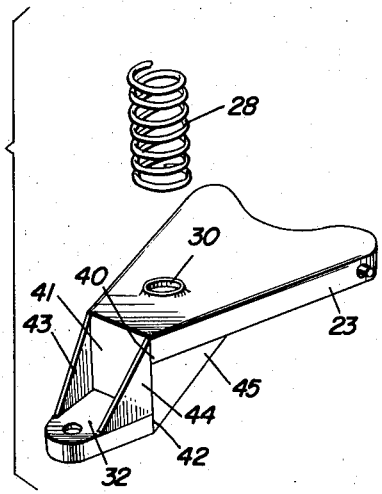
Fig.13
Fig.14
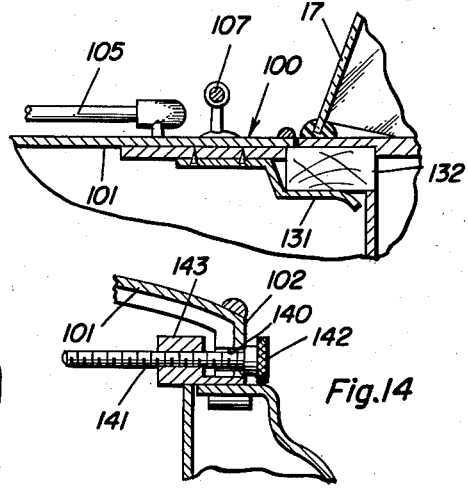
Howard M. Picking, Jr.
Harold E. Miller
INVENTORS
BY *[signatures]*
Attorneys

United States Patent Office 2,964,349
Patented Dec. 13, 1960

2,964,349

UNDERTAKER'S VEHICLE

Howard M. Picking, Jr., and Harold E. Miller, Johnstown, Pa., assignors to Miller-Picking Corporation, a corporation of Pennsylvania Filed June 10, 1958, Ser. No. 741,181

6 Claims. (Cl. 296—16)

This invention relates generally to vehicular constructions and pertains more particularly to a vehicle construction particularly adapted and suited for use by undertakers.

The casket and flowers in a funeral are normally carried separately and on separate vehicles although efforts have been made to provide a single vehicle combining both functions. However, a vehicle designed to carry both the casket and flowers is apt to be so cumbersome as to be unsightly. It is therefore of primary concern in connection with this invention to provide a novel vehicle construction utilizing, as a basis therefor, a conventional and commercially available vehicle selected for its pleasing lines and wherein the modification thereto adapting it for use in carrying both casket and flowers does not materially alter the original physical characteristics of the conventional vehicle and while yet permitting the same to be effectually utilized for the purposes intended.

Another object of this invention is to provide a modified vehicular construction wherein a conventionally commercially available vehicle is altered primarily by raising the frame and body thereof above the normal level and to reform a portion of the load supporting floor section at the rear of the vehicle in accordance with the amount by which the frame and body were raised so as to permit a casket to be carried without altering the overall contours and profile of the vehicle.

A further object of this invention is to provide a novel vehicular construction utilizing essentially as the basis therefor a commercially available vehicle of the type having a load receiving bed in the rear thereof and of low silhouette there being modifications made to such vehicle such as to permit the bed to carry a casket therein and at the same time to be covered by a lid or deck utilized for carrying flowers, the bed being so altered as to drop or lower at least a portion of the floor thereof to accommodate therein a casket such that the same does not project above the sides of the bed such as would require material alteration or modification to the profile or silhouette of the vehicle when the lid is in place.

Another object of this invention is to provide an improved vehicular construction particularly adapted for use in carrying a casket and flowers thereon wherein the novelty resides in raising the vehicular frame and body above that position in which it is normally supported and then dropping or lowering the portion of the load carrying floor to such a distance as to provide clearance thereabove to carry a casket within the confines of the vehicle and without materially altering or changing the original silhouette or profile of the vehicle, there being provided across the open top of the load carrying bed a cover adapted to carry flowers, the cover being demountably attached to the vehicle and adapted, when detached, to be carried directly to the grave site with the flowers supported thereon.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 2:
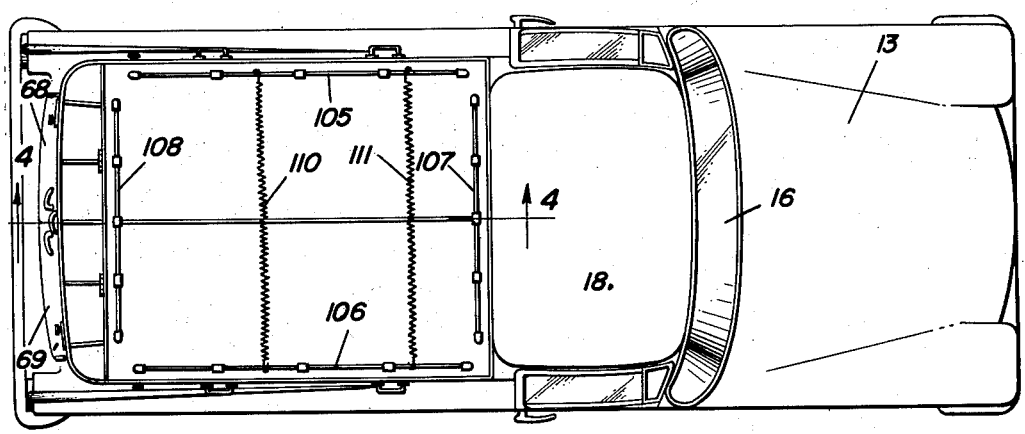
Figure 2 is a plan view of the assembly shown in Figure 1 showing details of the deck or cover construction.

Figure 4 is an enlarged vertical section taken substantially along the plane of section line 4—4 in Figure 2 illustrating details of the internal construction of the vehicular assemblage and illustrating, in dotted lines, a casket located in and supported by the bed of the vehicle and illustrating also in dotted lines, the open position of the rear edge portion of the cover such as to permit insertion and removal of a casket into the vehicle;

Figure 5 is an enlarged plan view of the rear portion of the vehicle with the cover or deck removed showing details of the construction internally of the vehicle;

Figure 6 is a transverse vertical section taken substantially along the plane of section line 6—6 in Figure 4 illustrating further details of the construction of the device and illustrating, in dotted lines, the disposition of the casket within the vehicle;

Figure 7 is an enlarged vertical section taken substantially along the plane of section line 7—7 in Figure 5 illustrating the supporting rollers for the cover assembly;

Figure 8 is a bottom perspective view of the cover assembly;

Figure 9 is an enlarged partial perspective view illustrating the corner portion of the cover assembly and illustrating the locking means associated therewith, as well as the rear hinged edge portion;

Figure 10 is a sectional view showing, diagrammatically, the manner in which the front wheels of the vehicle have been changed in their suspension means for raising the frame of the vehicle;

Figure 11 is an enlarged vertical section taken substantially along the plane of section line 11—11 in Figure 10 illustrating the disposition of the suspension of one of the front wheels;

Figure 12 is an exploded perspective view showing the lower control arm and spring of the front suspension unit, after modification;

Figure 13 is an enlarged sectional view showing the manner in which the forward portion of the cover is fitted to the vehicle body; and Figure 14 is an enlarged vertical section illustrating the locking means for the cover.

Figure 1:
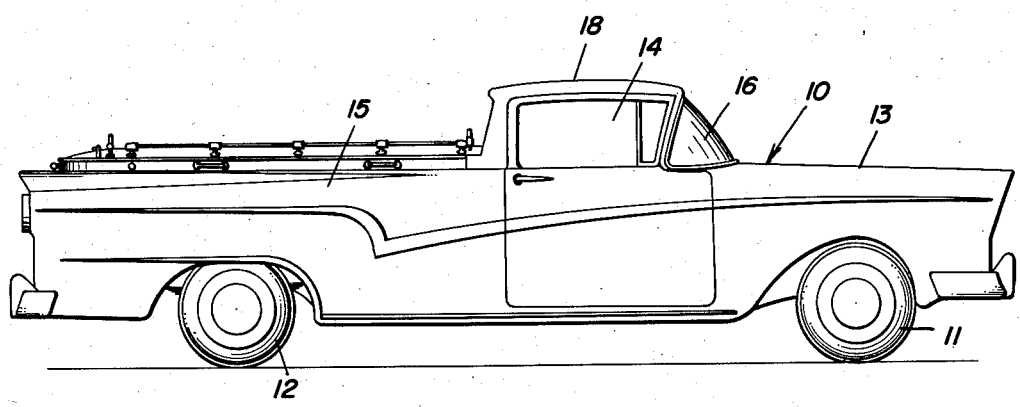
Figure 1 is a side elevational view of a vehicle constructed in accordance with this invention and illustrating the low silhouette and pleasing lines thereof.

Referring at this time more particularly to the drawings and especially Figure 1, the reference character 10 indicates in general the vehicle constructed in accordance with this invention. To understand fully the novelty residing in this invention, it is to be understood that the vehicle 10 may be originally purchased in commercially available form. However, it is to be understood that any suitable commercially available vehicle may be utilized in conjunction with this invention and modified as hereinafter set forth and described so as to provide the combined hearse and flower carrier having the functional and structural characteristics hereinafter set forth.

The vehicle itself is provided with the usual front wheels 11 and rear wheels 12 as well as the hood and engine compartment 13, the driver and passenger's compartment 14 and, in this particular instance, and preferably so, a load receiving bed portion indicated by the reference character 15.

The vehicle itself is provided with a windshield 16, and in the rear of the passenger's compartment, a rear window 17 extending downwardly from the roof 18.

In order to accommodate the commercially available form of the vehicle for the purposes of this invention, the suspension means for the front wheels is altered as is best illustrated in Figures 10-12 inclusive. In Figure 10, reference numeral 20 indicates a side rail member of the frame having means for pivotally attaching the inner end of a control arm 22. The portion of the frame illustrated in Figure 10 is the forward portion immediately adjacent a corresponding front wheel 11 and is normally provided with a cross-member extending between the frame rails 20, such cross member not being shown, to which the inner end of a lower control arm 23 is pivotally attached, as at the portion 24. A corresponding pivot for the upper control arm 22 is indicated by the reference character 25.

The outer ends of the upper and lower control arms 22 and 23 carrying a steering knuckle member 26 having a spindle rigid therewith upon which the wheel 11 is journaled, all as is well known in this particular art. Projecting laterally from the frame rail 20 is a saddle element 27 seating therewithin the upper end of the coil suspension spring 28, the lower end of which is seated upon the pad portion formed in the upper surface of the lower control arm 23 around the upstruck boss 30 thereon, see particularly Figure 12. The upper and lower control arms 22 and 23 are altered by dropping the outer ends thereof 31 and 32. This is accomplished in the upper control arm 22 by cutting the control arm generally along the line indicated by the reference character 33 and then welding a plate 34 thereto which projects downwardly and outwardly therefrom as is illustrated and which is then welded to the free end 31 of the severed upper control arm. A reinforcing web or plate 35 is utilized in the manner illustrated best in Figure 10 to rigidify and impart sufficient strength to the modified control arm as to compensate for the forces acting thereupon. The free end portion 31 of the upper control arm carries a ball joint element 36, in this particular type of suspension, upon which the steering knuckle 26 is pivoted to permit both the compression and rebound movement of the steering knuckle and the steering motion.

The lower control arm 23 is altered in the manner best illustrated in Figure 12. In this figure, it will be seen that the conventional lower control arm is severed along the line 40 and has welded thereto a substantially vertical plate 41 which depends therefrom and which is in turn welded to the corresponding severed edge 42 of the outer free end portion 32 of the lower control arm. Gusset or reinforcing plates 43 and 44 are welded to the outer side of the thus modified assembly and inner gusset plates 45 are provided correspondingly to impart sufficient rigidity to the modified assemblage as to permit it to carry the necessary loads.

By the above construction, it will be readily apparent that the frame of the vehicle as well as the body supported rigidly thereon is raised, with respect to the ground and the wheels 11 by an amount corresponding to the amount by which the free ends 31 and 32 of the upper and lower control arms are lowered. Care must be taken in modifying the suspension arms, that the steering geometry of the vehicle as originally designed thereinto is not altered or affected in such manner as would induce abnormal tire wear or materially affect the handling qualities of the vehicle.

The rear portion of the body and frame are likewise elevated with respect to the rear wheels 12. In this case, however, the usual longitudinally extending semi-elliptic springs 50 which are carried by the opposite side rails 20 of the frame are merely repositioned with respect to the rear axle assembly 51 of the vehicle. In the normal suspension, the springs 50 are underslung with respect to the axle housings 52 but in order to effect a raising of the frame and body, the springs are repositioned so as to overlie the axle housings and suitable saddles for these springs are constructed and attached to the axle housing for effective securement thereto.

In practicing this invention, the front wheel suspension means is not altered primarily for the purpose of permitting the construction hereinafter described but merely for the purpose of levelling the frame and body of the vehicle so as to not actuate the raised condition of the rear portion thereof. Actually, in practice, both the front and rear are raised several inches but this does not in itself materially affect the silhouette or profile of the original vehicle and actually is substantially undetectable even under careful observation.

As can be best seen in Figure 6, the load carrying bed of the vehicle is provided with side walls 60 and 61 and with a floor 62 which originally extends substantially horizontally completely between and across the side walls 60 and 61. However, in practicing this invention, a well indicated generally by the reference character 63 is formed longitudinally and centrally in the bed of the vehicle by dropping the central longtudinally extending floor section to form a bottom 64 for the well, the opposed side walls 65 and 66 of the well extending downwardly from the cut away portion of the floor 62 to support the bottom wall 64 or the well. The amount by which the frame and body are raised with respect to the rear wheels 12, and correspondingly the amount by which the bottom wall 64 may be dropped below the conventional or normal floor line is such as to permit a casket, indicated in dotted lines by the reference character 67 in Figure 6, to be supported within the well to extend substantially to or not materially above the upper edges of the side walls 60 and 61 of the bed. In this manner, the original silhouette or contour of the vehicle need not be altered to accommodate for the casket 67. At the same time, the bottom wall 64 of the well must be placed sufficiently above the final drive assembly for the vehicle as to properly clear the same even when the vehicle is fully loaded.

Figure 3:
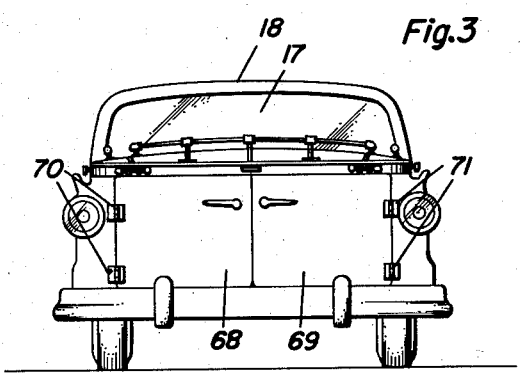
Figure 3 is a rear elevational view of the assembly shown in Figures 1 and 2 and illustrating the disposition of the doors in the back of the vehicle.

The rear of the bed is open but is normally closed by a pair of doors 68 and 69, see particularly Figure 3, hinged as at 70 and 71 to the rear sides of the side walls 60 and 61 for swinging outwardly at opposite sides of the vehicle to permit access into the interior of the bed. The bottom wall 64 of the bed, as can be best seen in Figure 5, is provided with a plurality of pairs of substantially rectangular cut outs 75, 76, 77 and 78 which journal therein corresponding pairs of rollers 79, 80, 81 and 82 by means of which a casket 67 may be easily loaded into and out of the vehicle within the well portion 63 thereof.

A vertically extending stop pin 85 is fixed to the bed in the forward portion of the well 63 and serves as a bumper against which the forward end of the casket rests and is preferably covered with resilient material or the like to cushion the casket during transport.

To cooperate with the bumper pin 85, the floor or bottom 64 of the well is provided with a longitudinally extending and centrally disposed strap 86 provided with a plurality of longitudinally spaced apertures 87 therein to receive the pin extension 88 of a bumper member 89 selectively therein, see particularly Figure 4. The series of apertures 87 are provided for the purpose of accommodating of caskets of slightly varying length, the bumper 89 being associated with the proper opening to permit substantially no longitudinal shifting of the casket when loaded.

As can be best seen in Figure 7, the side walls 60 and 61 of the bed are joined integrally with the fenders 90 at opposite sides of the vehicle in a bead portion 91 and with the outboard edge portions of the fenders 90 being generally horizontal as is indicated by the reference character 92 and provided with a gutter or individual recesses 93 therein receiving rollers 94 having axle members 95 projecting completely therethrough and laterally outwardly from the opposite sides thereof journaling the same in suitable notches or recesses 96 and 97 in the fender portion 92. There are a series of these rollers longitudinally spaced along the opposite sides of the side walls 60 and 61 for the purpose of supporting the lid or cover assembly indicated generally by the reference character 100 and is best illustrated in Figures 4, 6, 8 and 9.

As shown in these figures, the deck, lid or cover consists essentially of a main body portion 101 curved transversely slightly and having depending flanges 102 on its opposite sides terminating in inturned lower edge portions 103 which are adapted to engage and rest upon the various rollers 94 whereby the deck or cover may be slid longitudinally of the vehicle and off the rear end thereof for removal of the cover assembly. The cover assembly itself is provided with hand rails 105 and 106 along its opposite side edges and may be provided additionally at the forward and rear edges thereof with further hand rails 107 and 108 for facilitating carrying of the entire deck assembly together with any floral display or design supported thereon which may permit the flowers to be carried directly to the graveside in one trip and without altering the floral design and without damaging the flowers by repeated handling thereof. For this purpose, suitable springs 110 and 111 may be utilized, being stretched between opposite side rails 105 and 106 for supporting the floral design on the upper surface of the cover 100.

Additionally, the opposite sides of the cover are provided with outwardly projecting hand grip elements 115 and 116 which may be utilized in lieu of the hand rails 105 and 106 for carrying the cover assembly.

The rear edge portion 120 of the cover 100 is hinged as at 121 to the main body 101 of the cover and curves downwardly with respect thereto for engagement upon the upper edges of the door 68 and 69. Suitable latches 122 are provided in association with the rear edge portion 120 in order to selectively lock the same in place. As can be best illustrated in Figure 4, the cover portion 120 normally curves downwardly somewhat below the upper level of the casket 67 so as to prevent normally its removal or insertion into the vehicular bed. However, by virtue of this pivotal connection of the rear portion, the same can be swung upwardly to the dotted line position illustrated in Figure 4 to clear the top of the casket and permit insertion or removal of the casket from the bed.

The forward end of the cover 100 carries a pair of forwardly projecting spring fingers 130 and 131 adapted to engage beneath a cross piece or blocks 132, see particularly Figure 4, fixed to the vehicle body immediately below the rear window 17 thereof and by means of which the forward end of the cover is rigidly held in place. The rear end of the cover is provided with openings 140, see particularly Figure 14 in its depending flanges 102 receiving therethrough the screw elements 141 having enlarged hand knobs 142 on the outer sides thereof, and with the threaded portions of these screws being adapted to be received in nuts 143 fixed to the vehicle, as is shown. By screwing the elements 141 inwardly, the rear end of the cover is rigidly held in place.

Preferably, the main body portion 101 of the cover is formed of aluminum or other suitable lightweight material and is provided with suitable cross bracing 150 and longitudinal bracing 151 as to impart a sufficient rigidity thereto in order to function in the manner intended in supporting the floral displays thereon.

It is to be noted that, alternatively, the rear spring suspension can be changed to raise the body on the frame by leaving the rear spring in its normal position except the rear shackle which is lengthened to obtain the desired increase in body height. Further, a skirt may be added to the lower edge of the body and fenders to cover the void made when the entire body and frame is raised to the new position. This enhances the objective of maintaining the profile of the original vehicle. If it is desired to increase the entire over-all length of the finished car, this can be done by inserting new sections in the frame and body members and by adding a section in the drive shaft, brake lines, gas lines, etc.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An undertaker's vehicle comprising a combined hearse and flower carrier characterized by the low silhouette of its load-carrying portion, said vehicle including rear wheels and a final drive assembly interconnecting the same and a pair of front dirigible wheels, a frame supported by said wheels, and a body fixed to said frame, said body including, in its forward portion, a driver's compartment having a roof and provided with a rear window and a load receiving bed in its rear portion, a removable cover fixed to said bed, the rear of said bed being open and there being a pair of horizontally swingable doors mounted on the rear of the bed to close such open rear of the bed, said bed having a floor provided with a longitudinally extending well having a bottom clearing said final drive assembly but at a substantially lower level than said floor to accommodate a casket therein, the upper portion of which will clear said cover, said cover having a downwardly curved rear edge portion engaging upon the upper edges of said door and being hinged to the main body of the cover for swinging upwardly with respect thereto to clear said door and facilitate the loading and unloading of a casket within the bed without necessitating removal of said cover, said cover having hand rails along the opposite sides thereof for carrying the cover and the cover being adapted for arranging a floral display thereon.

2. An undertaker's vehicle comprising a combined hearse and flower carrier characterized by the low silhouette of its load-carrying portion, said vehicle including rear wheels and a final drive assembly interconnecting the same and a pair of front dirigible wheels, a frame supported by said wheels, and a body fixed to said frame, said body including a forward portion thereof, a driver's compartment and a load receiving bed in its rear portion, a removable cover fixed to said bed, the rear of said bed being open and there being a pair of horizontally swingable doors mounted on the rear of the bed to close such open rear of the bed, said bed having a floor provided with a longitudinally extending well having a bottom clearing said final drive assembly but at a substantially lower level than said floor to accommodate a casket therein, the upper portion of which will clear said cover, said cover having a downwardly curved rear edge portion engaging upon the upper edges of said door and being hinged to the main body of the cover for swinging upwardly with respect thereto to clear said door and facilitate the loading and unloading of a casket within the bed without necessitating removal of said cover.

3. The combination of claim 2 wherein the bottom of said well is provided with a series of substantially rectangular cutaway portions, rollers journalled on said bottom of the wall and protruding through said cutaway portion to support a casket thereon.

4. The combination of claim 3 wherein a bumper pin is fixed within the forward end of said well, and a further bumper pin is detachably secured adjacent the rear of said bed.

5. The combination of claim 2 wherein a plurality of rollers are journalled at the opposite sides of said bed along the upper edges of its side walls, said cover having side edge portions engaging said rollers.

6. The combination of claim 5 wherein forwardly projecting spring fingers are fixed to the forward edge of said cover engaging under a cooperating portion of said body.

References Cited in the file of this patent

UNITED STATES PATENTS

| | | |
|---|---|---|
| 595,116 | Burns | Dec. 7, 1897 |
| 1,862,286 | Tipton | June 7, 1932 |
| 2,657,087 | Morris | Oct. 27, 1953 |
| 2,757,041 | Alcorn | July 31, 1956 |
| 2,777,727 | Reilly | Jan. 15, 1957 |
| 2,803,490 | Ehret | Aug. 20, 1957 |